(12) United States Patent
Sandin et al.

(10) Patent No.: US 8,219,622 B2
(45) Date of Patent: Jul. 10, 2012

(54) SYSTEMS AND METHODS FOR PROVIDING EXTENDED PEERING

(75) Inventors: Craig M. Sandin, San Jose, CA (US);
Robin Q. Chung, Milpitas, CA (US);
Adele M. Newman, Mountain View, CA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1404 days.

(21) Appl. No.: 11/052,848

(22) Filed: Feb. 9, 2005

(65) Prior Publication Data

US 2006/0179148 A1 Aug. 10, 2006

(51) Int. Cl.
*G06F 15/16* (2006.01)
*G06F 15/173* (2006.01)

(52) U.S. Cl. ........................ 709/206; 709/224
(58) Field of Classification Search .................. 709/224, 709/206
See application file for complete search history.

(56) References Cited

U.S. PATENT DOCUMENTS

| | | | | |
|---|---|---|---|---|
| 7,068,594 B1 * | 6/2006 | Tasker | ............................ | 370/217 |
| 7,382,785 B2 * | 6/2008 | Chen et al. | ..................... | 370/399 |
| 7,552,175 B2 * | 6/2009 | Luo et al. | ....................... | 709/205 |
| 2003/0050966 A1 * | 3/2003 | Dutta et al. | .................... | 709/203 |
| 2003/0140131 A1 * | 7/2003 | Chandrashekhar et al. | .. | 709/223 |
| 2003/0202663 A1 * | 10/2003 | Hollis et al. | ................... | 380/282 |
| 2004/0044789 A1 * | 3/2004 | Angel et al. | ................... | 709/238 |
| 2004/0148333 A1 * | 7/2004 | Manion et al. | ................. | 709/201 |
| 2004/0228531 A1 * | 11/2004 | Fernandez et al. | ............. | 382/187 |
| 2004/0250130 A1 * | 12/2004 | Billharz et al. | ................ | 713/201 |
| 2004/0260701 A1 * | 12/2004 | Lehikoinen et al. | ............. | 707/10 |
| 2006/0253539 A1 * | 11/2006 | Casperson et al. | ............. | 709/207 |
| 2007/0168466 A1 * | 7/2007 | Tooley et al. | .................. | 709/218 |
| 2008/0002822 A1 * | 1/2008 | Petrovykh | ................ | 379/265.11 |
| 2010/0235919 A1 * | 9/2010 | Adelstein et al. | ............... | 726/25 |

FOREIGN PATENT DOCUMENTS

EP 0588415 * 3/1994

OTHER PUBLICATIONS

WO03021880 "Providing End-User Communication Services over Peer-to-Peer Internet protcol connections between service Providers" Mar. 13, 2003, pp. 1-40.*
Internetnews.com "MCI WorldCom Debuts Web-Based Tool for ISPs", Oct. 7, 1998, p. 1-4.*
Cook Network Consultants "The Cook Report on Internet", Jan. 22, 2002, p. 1-42.*
WO9732256 "Method for Creating Peer-To-Peer Connection over an interconnected network to facilitate conferencing among users" Feb. 28, 1997, p. 1-19.*
Earthwebnews.com, "MCI WorldCom Debuts Web-Based Tool for ISPs," Oct. 7, 1998, http://news.earthweb.com/xSP/article.php/44861, 3 pages.
MCI MAE Peering, "PeerMaker Provisioning Tool," Aug. 27, 2003, http://web.archive.org/web/20030827202631/http://www.mae.net/peer/peermaker.htm, 2 pages.
Steve Feldman, MCI WorldCom, Inc., "MAE East Past,Present, and Future," Peering Workshop, Mar. 23, 1999, 10 pages.

* cited by examiner

*Primary Examiner* — Karen Tang

(57) ABSTRACT

A system includes at least one network device that allows users to establish peering connections between ports in different geographic locations via web-based interfaces.

29 Claims, 12 Drawing Sheets

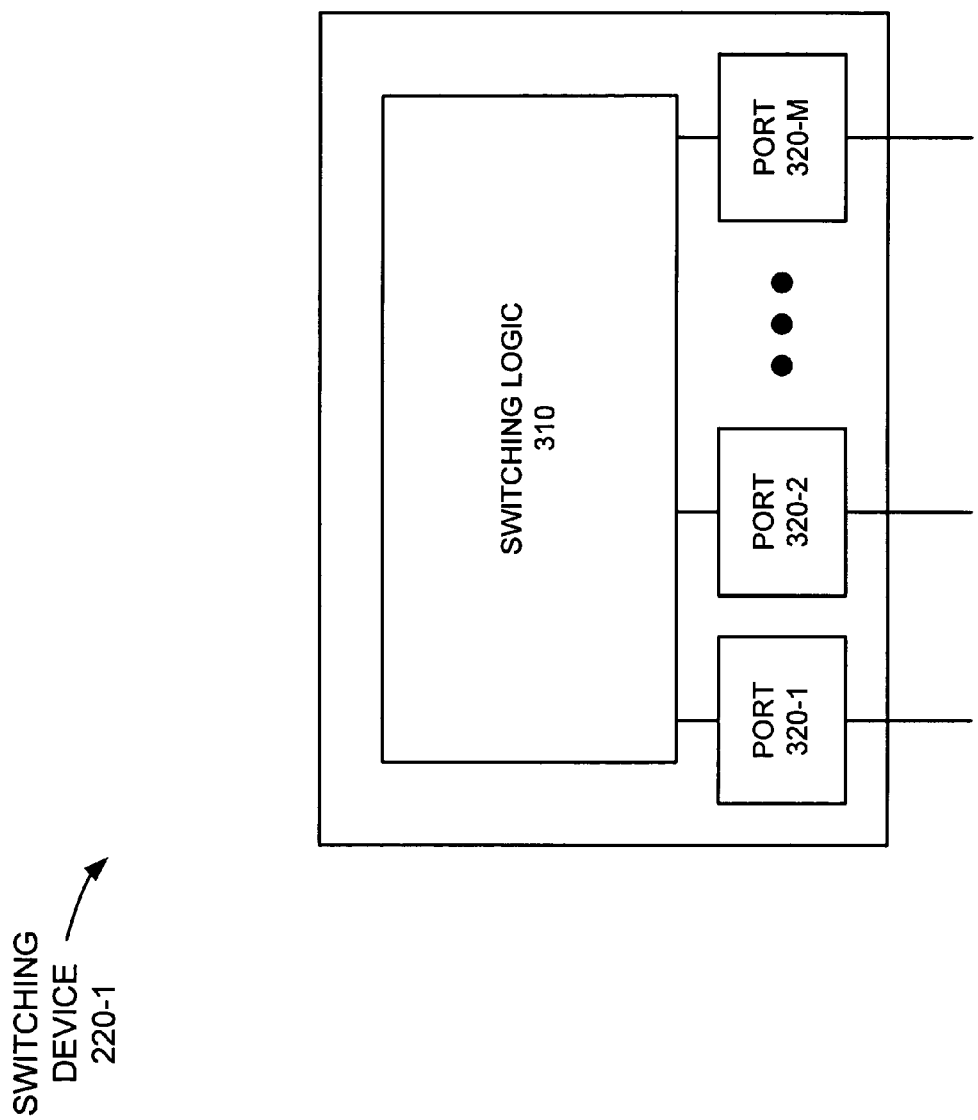

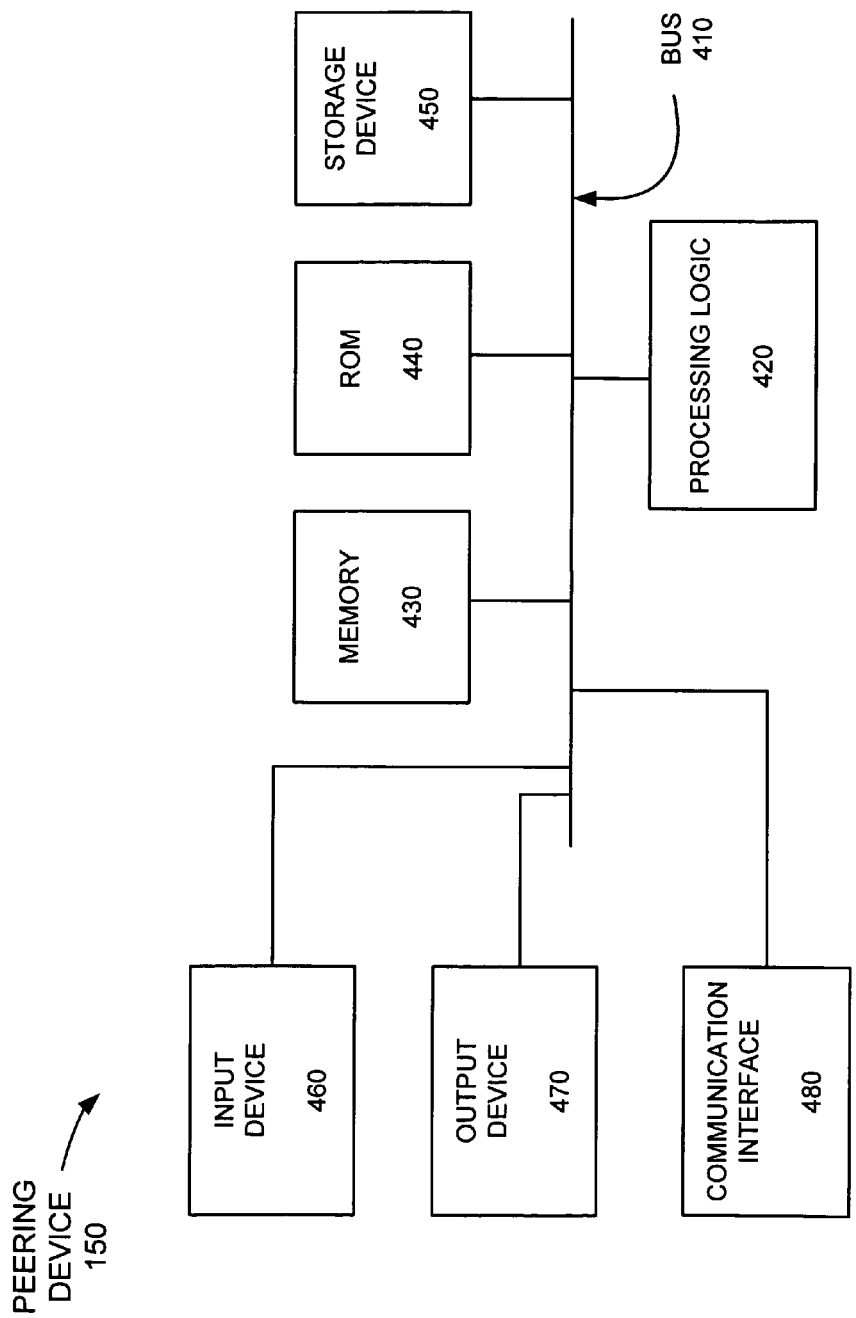

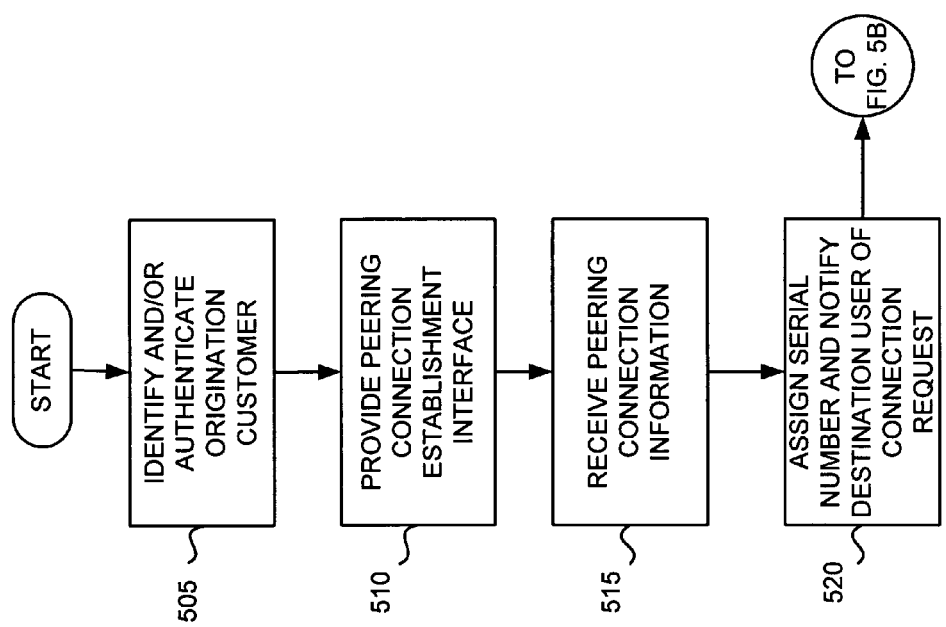

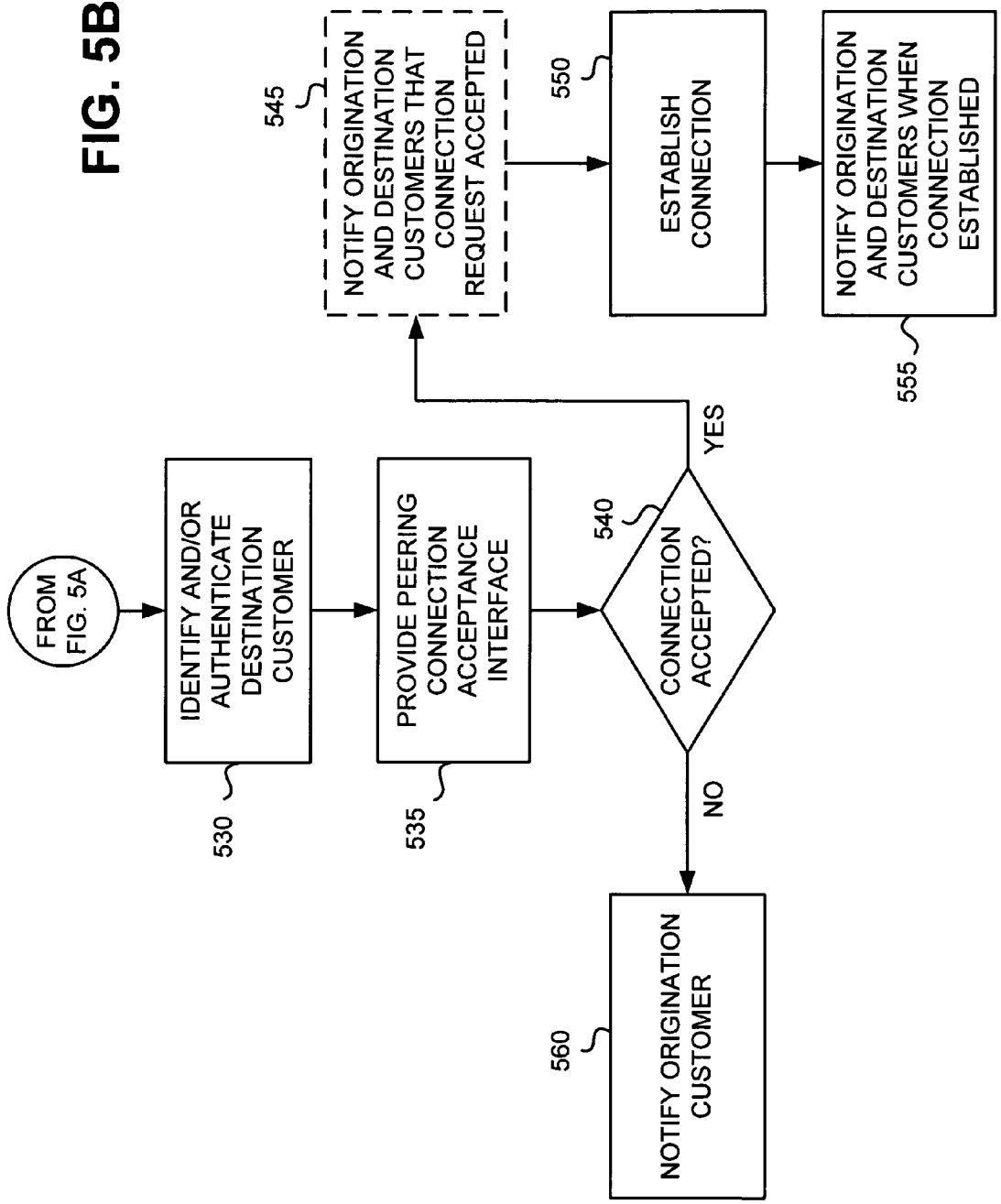

FIG. 8

Request for New Connection

SERIAL NUMBER: 1234567890

CONNECTION FROM SP 120A TO SP 120G

FROM: SP: 120A; Port ID: ABCD; DLCI 601
(601 IS THE LOCAL DLCI TO CONFIGURE INTO SP 120A'S BORDER ROUTER FOR THIS CONNECTION)

TO: SP: 120G; Port ID: MNOP; VLAN ID 101
(101 IS THE LOCAL VLAN ID TO CONFIGURE INTO SP 120G'S BORDER ROUTER FOR THIS CONNECTION)

CONNECTION TYPE: EXTENDED PEERING (DC-SJ)

SERVICE CLASS: BEST EFFORT

IP VERSION: IPv4

TO ACCEPT THIS REQUEST, CLICK HERE: WWW.PEERMAKER.COM

NOTE: THE ABOVE PENDING REQUEST WILL BE CANCELED AUTOMATICALLY WITHIN 45 DAYS

Accepted New Connection

SERIAL NUMBER: 1234567890

CONNECTION FROM SP 120A TO SP 120G

FROM: SP: 120A; Port ID: ABCD; DLCI 601
(601 IS THE LOCAL DLCI TO CONFIGURE INTO SP 120A'S BORDER ROUTER FOR THIS CONNECTION)

TO: SP: 120G; Port ID: MNOP; VLAN ID 101
(101 IS THE LOCAL VLAN ID TO CONFIGURE INTO SP 120G'S BORDER ROUTER FOR THIS CONNECTION)

CONNECTION TYPE: EXTENDED PEERING (DC-SJ)

SERVICE CLASS: BEST EFFORT

IP VERSION: IPv4

FIG. 10

Establishment of New Connection Successful

SERIAL NUMBER: 1234567890

A CONNECTION WAS ESTABLISHED FROM SP 120A TO SP 120G

FROM: SP: 120A; Port ID: ABCD; DLCI 601
(601 IS THE LOCAL DLCI TO CONFIGURE INTO SP 120A'S BORDER ROUTER FOR THIS CONNECTION)

TO: SP: 120G; Port ID: MNOP; VLAN ID 101
(101 IS THE LOCAL VLAN ID TO CONFIGURE INTO SP 120G'S BORDER ROUTER FOR THIS CONNECTION)

CONNECTION TYPE: EXTENDED PEERING (DC-SJ)

SERVICE CLASS: BEST EFFORT

IP VERSION: IPv4

FIG. 11

SYSTEMS AND METHODS FOR PROVIDING EXTENDED PEERING

FIELD OF THE INVENTION

Implementations consistent with the principles of the invention relate generally to communications networks and, more particularly, to systems and methods for providing extended peering in communications networks.

BACKGROUND OF THE INVENTION

Establishment of peering connections is quite common. A peering connection is a persistent connection between a service provider (SP), such as an Internet Service Provider (ISP), associated with a first customer and the SP associated with another customer that provides reliable and ordered transfers of data. A company may, for example, establish a peering connection between its main office and a satellite office to enable employees at the satellite office to access and retrieve files from devices attached to the main office's network, as if they were physically attached to that network. Establishment of peering connections is typically cumbersome and often requires an experienced network administrator.

SUMMARY OF THE INVENTION

In an implementation consistent with the principles of the invention, a method includes receiving a request from a first customer via a web-based interface. The request identifies a peering connection between a first port associated with the first customer and located in a first geographical region and a second port associated with a second customer and located in a second, different geographical region. The method further includes establishing the peering connection based on the received request.

In another implementation consistent with the principles of the invention, a system includes a network device. The network device is configured to cause a web-based interface to be provided to a user device, where the web-based interface allows a user to request that an extended peering connection be established; receive information from the user relating to the extended peering connection; and cause the extended peering connection to be established between the user and a second user based on the received information.

In still another implementation consistent with the principles of the invention, a method includes causing a graphical user interface to be provided to a user device, where the graphical user interface allows a user to request that a peering connection be established between two ports located in different geographic regions; receiving information relating to the peering connection from the user device; and establishing the peering connection between the two ports based on the received information.

In a further implementation consistent with the principles of the invention, a system includes at least one network device that allows users to establish peering connections between ports in different geographic locations via web-based interfaces.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 illustrates an exemplary configuration of a switching device in an exemplary implementation consistent with the principles of the invention;

FIG. 4 illustrates an exemplary configuration of a peering device in an implementation consistent with the principles of the invention;

FIGS. 5A and 5B illustrate an exemplary process for establishing an extended peering connection in an implementation consistent with the principles of the invention;

FIG. 8 illustrates an exemplary e-mail notification that may be sent to a customer in an implementation consistent with the principles of the invention;

FIG. 10 illustrates another exemplary e-mail notification that may be sent to a customer in an implementation consistent with the principles of the invention; and FIG. 11 illustrates yet another exemplary e-mail notification that may be sent to a customer in an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide extended peering capabilities in a communications network. Extended peering allows a customer to peer with other customers regardless of where the other customers are located. In one implementation, the customer may build and maintain peering connections with other customers using, for example, web-based graphical user interfaces.

Exemplary System

Figure 1:
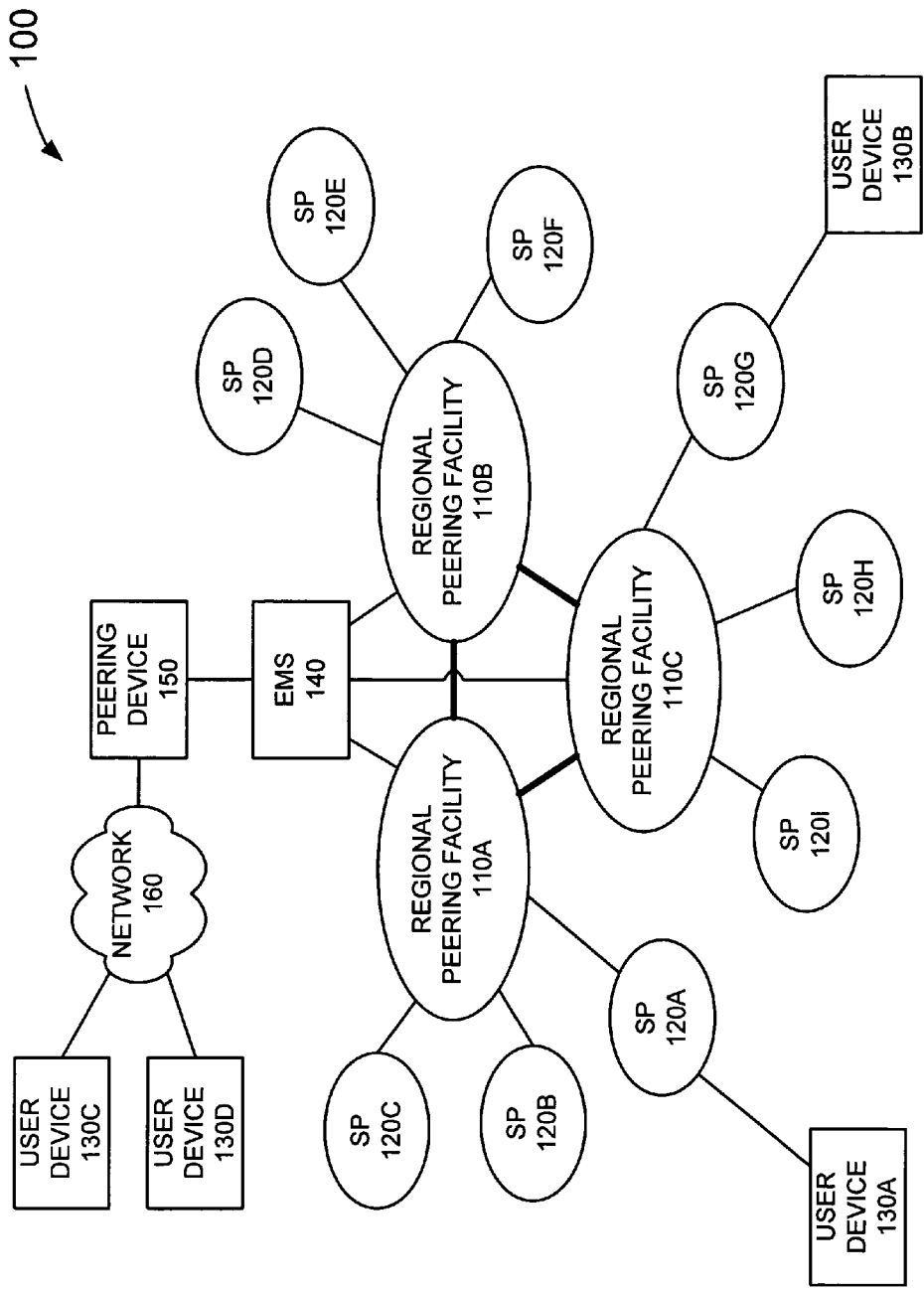
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include regional peering facilities 110A-110C (referred to collectively as "peering facilities 110"), service providers (SPs) 120A-120I (referred to collectively as "SPs 120"), user devices 130A-130D (referred to collectively as "user devices 130"), an element management system (EMS) 140, a peering device 150, and a network 160. The number of regional peering facilities 110, SPs 120, user devices 130, EMSs 140, and peering devices 150 illustrated in FIG. 1 is provided for simplicity. In practice, a typical system could include more or fewer regional peering facilities 110, SPs 120, user devices 130, EMSs 140, and peering devices 150 than illustrated in FIG. 1.

Regional peering facilities 110 may include one or more devices that facilitate the transfer of data between network devices, such as SPs 120. In one implementation, each regional peering facility 110A-110C is associated with a different geographic region (e.g., one may be located on the east coast of the United States or a particular region within the eastern part of the United States and another may be located on the west coast or a particular region within the western part of the United States) and acts as a point of presence (POP) for that region by interconnecting various data networks and SPs 120. In one exemplary implementation consistent with the principles of the invention, each regional peering facility 110A-110C may include a Metropolitan Area Exchange (MAE®) Internet Exchange Point.

SPs 120 may include one or more devices that provide network access to customers via, for example, user devices 130. In one implementation, one or more of SPs 120 may include Internet Service Providers (ISPs). Each SP 120A-120I may include, for example, one or more routing devices, security devices, such as firewalls, and/or other common devices for providing network access to customers.

User devices 130 may include devices, such as personal computers, mainframe computers, servers, lap tops, personal digital assistants (PDAs), wireless telephones, etc., threads or processes running on these devices or other types of devices, and/or objects executable by these devices. In one implementation, user devices 130 may allow customers to establish and maintain peering connections with other customers in system 100. For example, a customer at a user device 130A-130D can establish a peering connection between a pair of SPs. It will be appreciated based on the description below that the user can establish the peering connection via any of user devices 130A-130D. For explanatory purposes, it is assumed that a user (referred to hereinafter as an "origination customer") at user device 130C establishes a peering connection between SP 120A and SP 120G.

EMS 140 may include one or more network devices that receive data from regional peering facilities 110 and route the data to peering device 150. EMS 140 may also receive data from peering device 150 and route the data to the appropriate regional peering facility or facilities.

Peering device 150 may include one or more types of computer systems, such as a mainframe, minicomputer, or personal computer. In one implementation consistent with the principles of the invention, peering device 150 may include one or more servers. Peering device 150 may receive peering connection requests from user devices 130 and cause peering connections to be established based on the requests. While shown as located external to regional peering facilities 110, in other implementations, peering device 150 may be located in one or more of regional peering facilities 110.

Network 160 may include a local area network (LAN), a wide area network (WAN), a telephone network, such as the Public Switched Telephone Network (PSTN), an intranet, the Internet, or a combination of networks.

Regional peering facilities 110, SPs 120, user devices 130, EMS 140, and peering device 150 may connect to each other via wired, wireless, and/or optical connections.

Exemplary Configuration of a Regional Peering Facility

Figure 2:
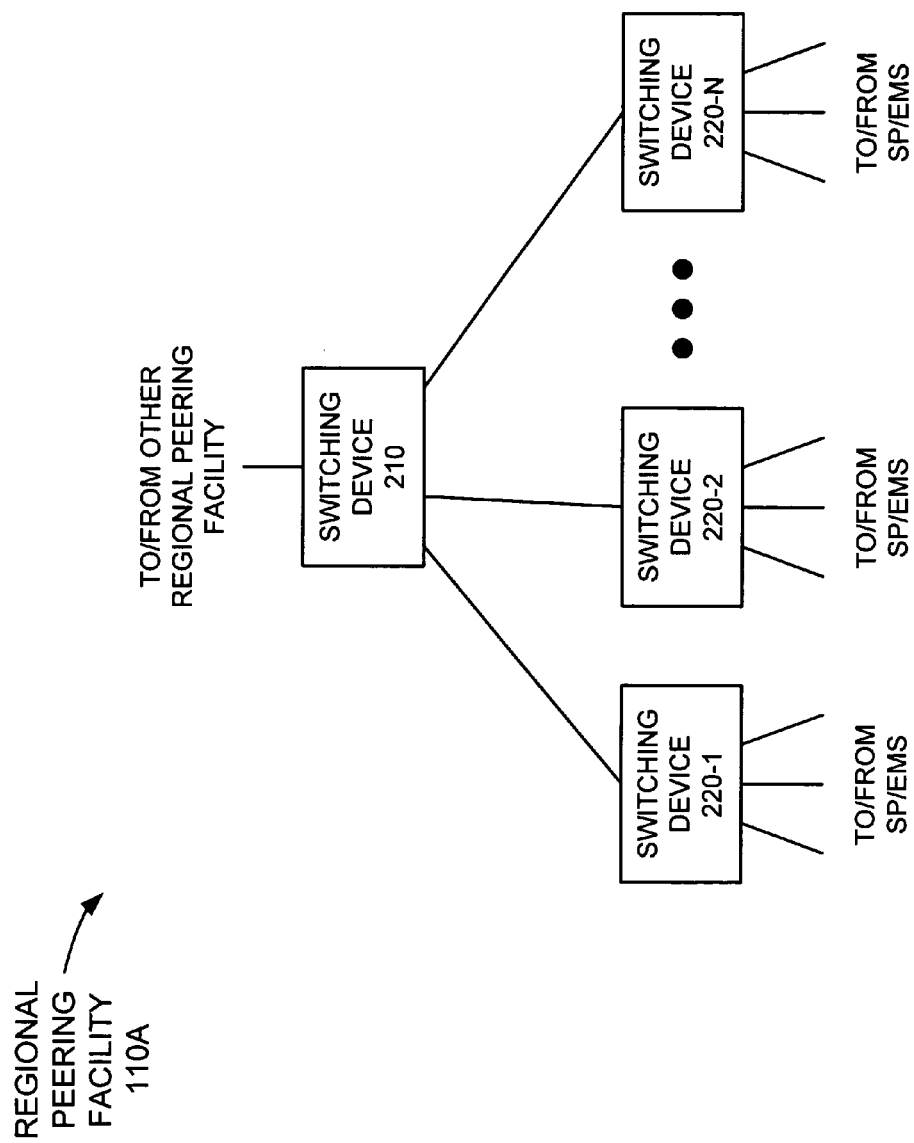
FIG. 2 illustrates an exemplary configuration of a regional peering facility in an exemplary implementation consistent with the principles of the invention.

FIG. 2 illustrates an exemplary configuration of a regional peering facility, such as regional peering facility 110A, in an exemplary implementation consistent with the principles of the invention. Regional peering facilities 110B and 110C may be similarly configured.

As illustrated, regional peering facility 110A may include switching devices 210 and 220-1 through 220-N (referred to collectively as "switching devices 220"). The number of switching devices 210/220 illustrated in FIG. 2 is provided for simplicity. In practice, a typical regional peering facility 110A could include more or fewer switching devices 210/220. Moreover, it will be appreciated that the configuration illustrated in FIG. 2 is purely exemplary. Also, regional peering facility 110A may include other devices that aid in receiving, processing, and/or transmitting data.

Switching device 210 may connect to switching devices 220 and one or more other regional peering facilities 110. Switching device 210 may include one or more devices for receiving data from switching devices 220 and forwarding the data to the appropriate regional peering facility 110B/110C. Switching device 210 may also include one or more devices for receiving data from a regional peering facility 110B/110C and forwarding the data to the appropriate switching device 220-1 through 220-N.

Switching devices 220 may connect to switching device 210 and to customers' devices, such as user devices 130, via SPs 120. Switching devices 220 may also connect to EMS 140. Each switching device 220-1 through 220-N may include one or more devices for receiving data from an SP 120A-120I and forwarding the data to switching device 210 or EMS 140. Each switching device 220-1 through 220-N may also include one or more devices for receiving data from switching device 210 or EMS 140 and forwarding the data to the appropriate SP 120A-120I.

FIG. 3 illustrates an exemplary configuration of a switching device, such as switching device 220-1, in an exemplary implementation consistent with the principles of the invention. Switching devices 220-2 through 220-N and switching device 210 may be similarly configured.

As illustrated, switching device 220-1 may include switching logic 310 and a number of ports 320-1 through 320-M (referred to collectively as "ports 320"). The number of devices (i.e., switching logic and ports) illustrated in FIG. 3 is provided for simplicity. In practice, a typical switching device 220-1 could include more or fewer devices. Moreover, it will be appreciated that the configuration illustrated in FIG. 3 is purely exemplary. For example, switching device 220-1 may include other devices that aid in receiving, processing, and/or transmitting data.

Switching logic 310 may include processing logic for processing received data and determining how and where to transfer data. For example, switching logic 310 may include one or more forwarding tables and logic for converting data from a first format to a second format.

Ports 320 may include one or more devices for receiving data from and transferring data to other network devices, such as an SP 120A-120I or EMS 140, in a well-known manner. In one implementation, SPs 120 may physically connect to ports 320. For example, as illustrated in FIG. 1, SP 120A may physically connect to a port 320-1 through 320-M of regional peering facility 110A. In some implementations, a single SP 120A-120I may connect to more than one port 320-1 through 320-M of a regional peering facility 110A-110C. Each port 320-1 through 320-M may be associated with a unique identifier.

Exemplary Configuration of the Peering Device

FIG. 4 illustrates an exemplary configuration of peering device 150 in an implementation consistent with the principles of the invention. It will be appreciated that user devices 130A-130D may be similarly configured. As illustrated, peering device 150 may include a bus 410, processing logic 420, a memory 430, a read only memory (ROM) 440, a storage device 450, an input device 460, an output device 470, and a communications interface 480. It will be appreciated that peering device 150 may include other components (not shown) that aid in receiving, transmitting, and/or processing data.

Bus 410 may permit communication among the components of peering device 150. Processing logic 420 may include any type of conventional processor or microprocessor that interprets and executes instructions. In other implementations, processing logic 420 may be implemented as or include an application specific integrated circuit (ASIC), field programmable gate array (FPGA), or the like. Memory 430 may include a random access memory (RAM) or another type of dynamic storage device that stores information and instructions for execution by processing logic 420. ROM 440 may include a conventional ROM device and/or another type of static storage device that stores static information and instructions for the processing logic 420. Storage device 450 may include some other type of magnetic or optical recording medium and its corresponding drive for storing information and/or instructions.

Input device 460 may include a conventional device that permits an operator to input information to peering device 150, such as a keyboard, a keypad, a mouse, a pen, a microphone, one or more biometric mechanisms, and the like. Output device 470 may include a conventional device that outputs information to the operator, including a display, a printer, a speaker, etc.

Communication interface 480 may include any transceiver-like mechanism that enables peering device 150 to communicate with other devices and/or systems, such as user devices 130. For example, communication interface 480 may include mechanisms for communicating with a user device 130A-130D via a network, such as network 160.

As will be described in detail below, peering device 150, consistent with the principles of the invention, may provide graphical user interfaces to a customer associated with a user device 130A-130D to allow that customer to establish and maintain peering connections. Peering device 150 may perform these and other functions in response to processing logic 420 executing software instructions contained in a computer-readable medium, such as memory 430. A computer-readable medium may be defined as one or more memory devices and/or carrier waves. The software instructions may be read into memory 430 from another computer-readable medium, such as data storage device 450, or from another device via communication interface 480. The software instructions contained in memory 430 may cause processing logic 420 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Processing

FIGS. 5A and 5B illustrate an exemplary process for establishing an extended peering connection in an implementation consistent with the principles of the invention. Processing may begin with a customer (referred to hereinafter as the "origination customer") using a user device, such as user device 130C, wanting to establish a peering connection with another customer (referred to hereinafter as the "destination customer"). In this exemplary implementation, it is assumed that the peering connection is to be established between a port associated with SP 120A and a port associated with SP 120G and that these ports are located in different geographic regions and associated with different regional peering facilities 110.

To establish the peering connection, the origination customer may access a predetermined network location associated with peering device 150 using user device 130C. In one implementation, the predetermined network location may include a web page. The origination customer may request the web page by, for example, typing in a Uniform Resource Locator (URL) associated with the web page. In response, peering device 150 may cause an initial web page to be displayed at user device 130C.

Figure 6:
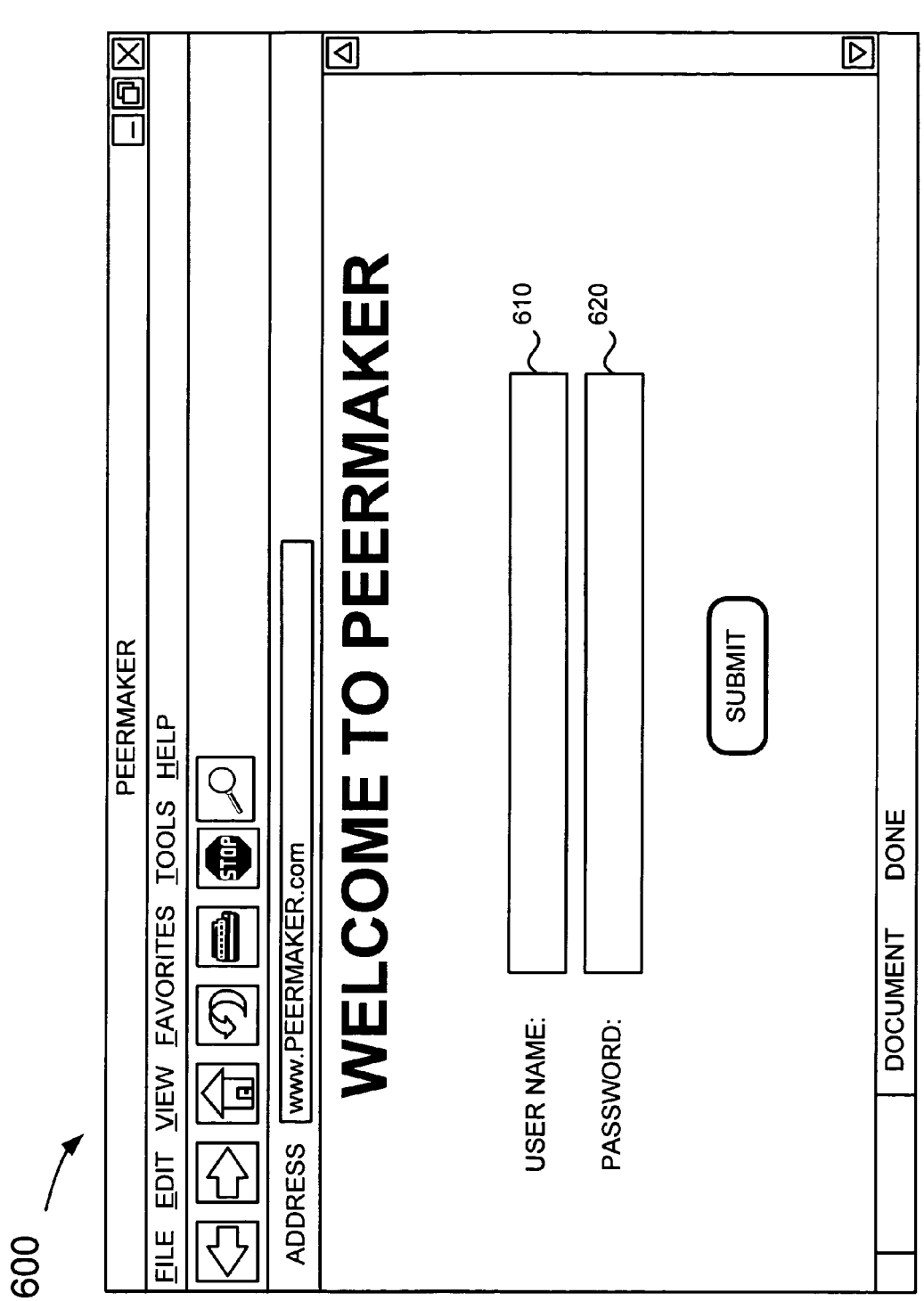
FIG. 6 illustrates an exemplary initial web page that may be forwarded to a user device in an implementation consistent with the principles of the invention.

FIG. 6 illustrates an exemplary initial web page 600 (also called a graphical user interface) that may be forwarded to user device 130C. As illustrated, graphical user interface 600 may include a user name field 610 and a password field 620. User name field 610 may allow the origination customer to enter a user name. Password field 620 may allow the origination customer to enter a password. Once the origination customer has entered a name and password, the customer may click the SUBMIT button to transfer the name and password to peering device 150.

Peering device 150 may identify and/or authenticate the origination customer (act 505). For example, peering device 150 may compare the user name and password to a list of authorized user names and passwords. If the origination customer's user name and password pair matches a user name and password pair from the authorized list, then peering device 150 may determine that the origination customer is authorized. Peering device 150 may then cause an introductory graphical user interface to be presented to the origination customer that allows the origination customer to select a peering function to be performed. Assume that the origination customer elects to add a new peering connection.

Figure 7:
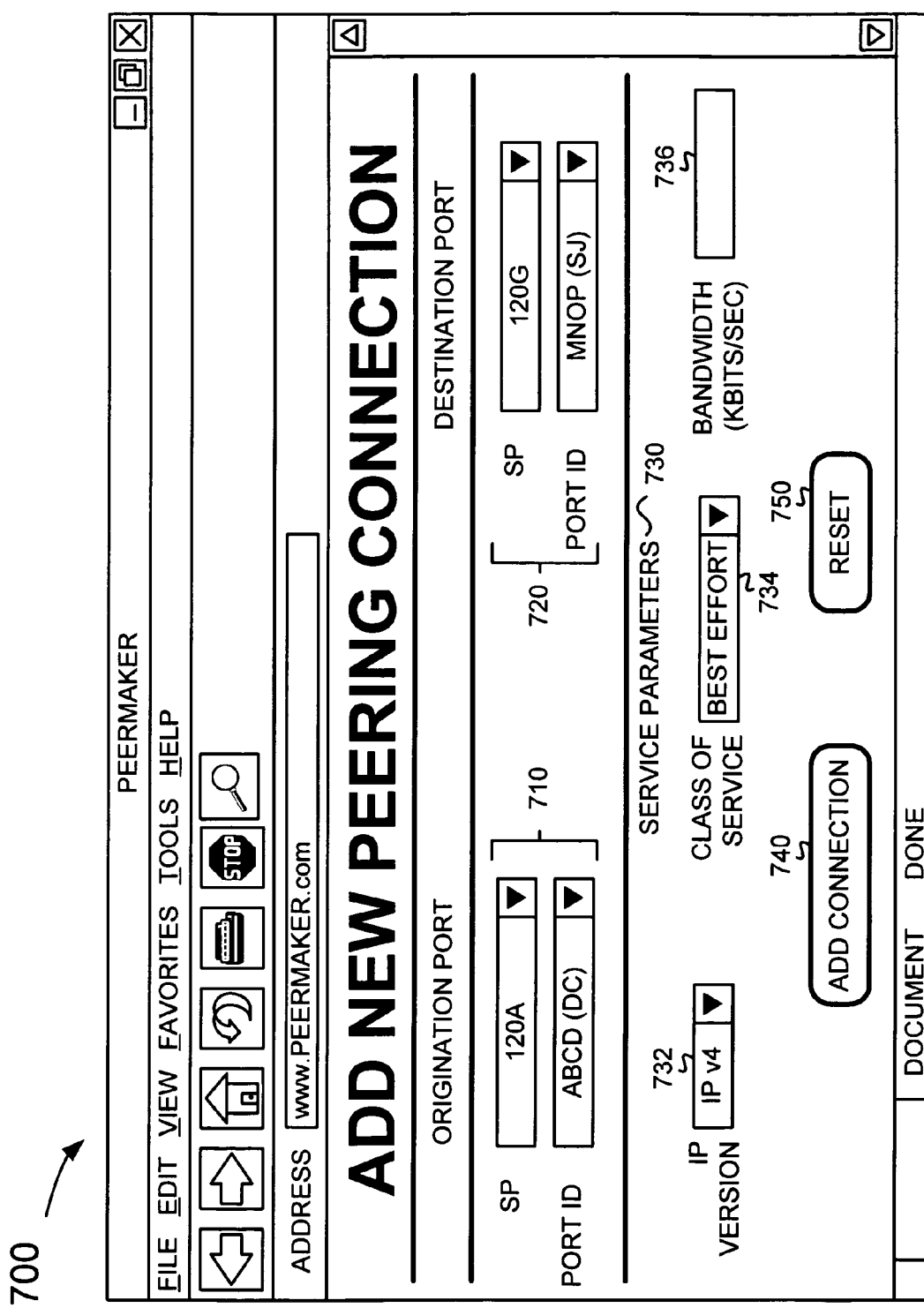
FIG. 7 illustrates an exemplary peering connection establishment graphical user interface that may be presented to an origination customer in an implementation consistent with the principles of the invention.

In response, peering device 150 may cause a peering connection establishment graphical user interface to be presented to the origination customer (act 510). FIG. 7 illustrates an exemplary peering connection establishment graphical user interface 700 that may be presented to the origination customer in an implementation consistent with the principles of the invention. As illustrated, graphical user interface 700 may include an origination port section 710, a destination port section 720, and a service parameters section 730. Graphical user interface 700 may be associated with additional or other sections or fields that aid in the establishing peering connections.

Origination port section 710 may allow the origination customer to specify an SP with which the origination customer is associated and a port identifier (ID) associated with a port on the regional peering facility with which the SP is connected. In one implementation, the origination customer may specify the SP and port ID via pull-down menus. As illustrated in FIG. 7, the origination customer has specified SP 120A and port ID ABCD that is associated with regional peering facility 110A. In one implementation consistent with the principles of the invention, the port ID may be associated with a regional identifier denoted in parentheses. In the example illustrated in FIG. 7, regional peering facility 110A is assumed to be located in the District of Columbia (denoted "DC").

Destination port section 720 may allow the origination customer to specify an SP with which the origination customer wishes to peer. Destination port section 720 may also allow the origination customer to specify a port identifier (ID) associated with a remote port on the regional peering facility with which the destination SP is connected. In one implementation, the origination customer may specify the SP and port ID in destination port section 720 via pull-down menus. As illustrated in FIG. 7, the origination customer has specified SP 120G and port ID MNOP that is associated with regional peering facility 110C. As set forth above, in one implementation consistent with the principles of the invention, the port ID may be associated with a regional identifier denoted in parentheses. In the example illustrated in FIG. 7, regional peering facility 110C is assumed to be located in San Jose (denoted "SJ").

Service parameters section 730 may include a protocol field 732, a class of service field 734, and a bandwidth field 736. Protocol field 732 may allow the origination customer to specify a protocol to be used for communications over the new peering connection. In one implementation, the origination customer may specify the protocol via a pull-down menu. As illustrated in FIG. 7, the origination customer has specified Internet Protocol (IP) version 4. Class of service field 734 may allow the origination customer to specify a class of service, such as priority service or best effort service, for the new peering connection. Priority service allows the customer to specify the bandwidth associated with the requested peering connection. Best effort service provides a small amount of reserved bandwidth, which may not be selectable by the customer, and a relatively large peak rate. In one implementation consistent with the principles of the invention, the origination customer may select the class of service via a pull-down menu. In some implementations, the origination customer may only make the class of service selection between priority and best effort when establishing a regional peering connection (i.e., a peering connection that utilizes a single regional peering facility). The origination customer may be provided with best effort service when establishing an extended peering connection (i.e., a peering connection that utilizes more than one regional peering facility). Bandwidth field 736 may allow the origination customer to specify a desired bandwidth. In one implementation, the origination customer may be allowed to specify a desired bandwidth when priority service has been selected in class of service field 734. The origination customer may, for example, specify the bandwidth in kilobits per second (kbits/sec).

Once the origination customer has entered the above information for the new peering connection, the origination customer may select an ADD CONNECTION button 740 to transmit the new peering connection information to peering device 150. Graphical user interface 700 may also include a RESET button 750 that removes the information entered in sections 710, 720, and 730 and returns graphical user interface 700 to its original form.

Returning to the processing described in FIGS. 5A and 5B, peering device 150 may receive the new peering connection request from the origination customer (act 515, FIG. 5A). Peering device 150 may assign a serial number to the peering connection request (act 520). The serial number provides the origination and destination customers with a reference number that may be provided to a customer service representative in the event they are unable to establish the peering connection. Peering device 150 may notify the destination customer and, optionally, the origination customer of the origination customer's request to establish a new peering connection (act 520). Peering device 150 may notify the origination and destination customers via any well-known technique (e.g., e-mail, facsimile, instant message, telephone, etc.). Among other things, the notification allows the destination customer to know that the origination customer wishes to establish a peering connection with the destination customer.

FIG. 8 illustrates an exemplary e-mail notification 800 that may be sent to the origination and destination customers in an implementation consistent with the principles of the invention. As illustrated, e-mail notification 800 may specify the serial number that has been assigned to this new peering connection transaction and summarize the information requested by the origination customer.

For example, e-mail notification 800 may specify the origination customer's connection information (e.g., from SP 120A, port ID ABCD, and the origination customer's connection identifier with which a router associated with SP 120A is to be configured). In one implementation consistent with the principles of the invention, the connection identifier may be specified as a virtual path identifier/virtual circuit identifier (VPI/VCI), a data link connection identifier (DLCI), a virtual local area network (VLAN) identifier (ID), or another type of identifier. In this example, the connection identifier for the origination customer is a DLCI with a value of 601.

E-mail notification 800 may also specify the destination customer's connection information (e.g., to SP 120G, port ID MNOP, and the destination customer's connection identifier with which a router associated with SP 120G is to be configured). In the example illustrated in FIG. 8, the connection identifier for the destination customer is a VLAN ID with a value of 101.

E-mail notification 800 may specify the type of connection requested by the origination customer. In this example, since the port from which the connection is to be established and the port to which the connection is to be established are located in different geographical regions and are associated with different regional peering facilities 110, e-mail notification 800 may specify the connection as extended peering. If the origination customer and destination customer were associated with the same regional peering facility, then e-mail notification 800 may specify the connection as regional peering. E-mail notification 800 may further specify the service class and protocol requested by the origination customer. Although not shown, e-mail notification 800 may include bandwidth information when, for example, the origination customer has selected priority service. Moreover, in some implementations, e-mail notification 800 may include a link to a web page that the destination customer may select to accept the peering connection.

In some implementations consistent with the principles of the invention, peering device 150 may cancel the origination customer's new peering connection request if the new peering connection is not established within a predetermined period of time, as indicated in e-mail notification 800. In one implementation, the predetermined time period may be 45 days.

Returning to the processing described in FIGS. 5A and 5B, upon receipt of notification 800 from peering device 150, the destination customer may access a predetermined network location using a user device. It is assumed hereafter that the destination customer accesses the predetermined network location using user device 130D. In one implementation, the predetermined network location may include a web page. The destination customer may request the web page by, for example, typing in a URL associated with the web page or possibly selecting a link in e-mail notification 800. In response, peering device 150 may cause an initial web page to be displayed at user device 130D, such as web page 600 described above with respect to FIG. 6. As set forth above, the initial web page allows peering device 150 to identify and/or authenticate the destination customer.

Peering device 150 may identify and/or authenticate the destination customer (act 530, FIG. 5B). For example, peering device 150 may compare the user name and password entered by the destination customer to a list of authorized user names and passwords. If the destination customer's user name and password pair matches a user name and password pair from the authorized list, then peering device 150 may determine that the destination customer is authorized.

Figure 9:
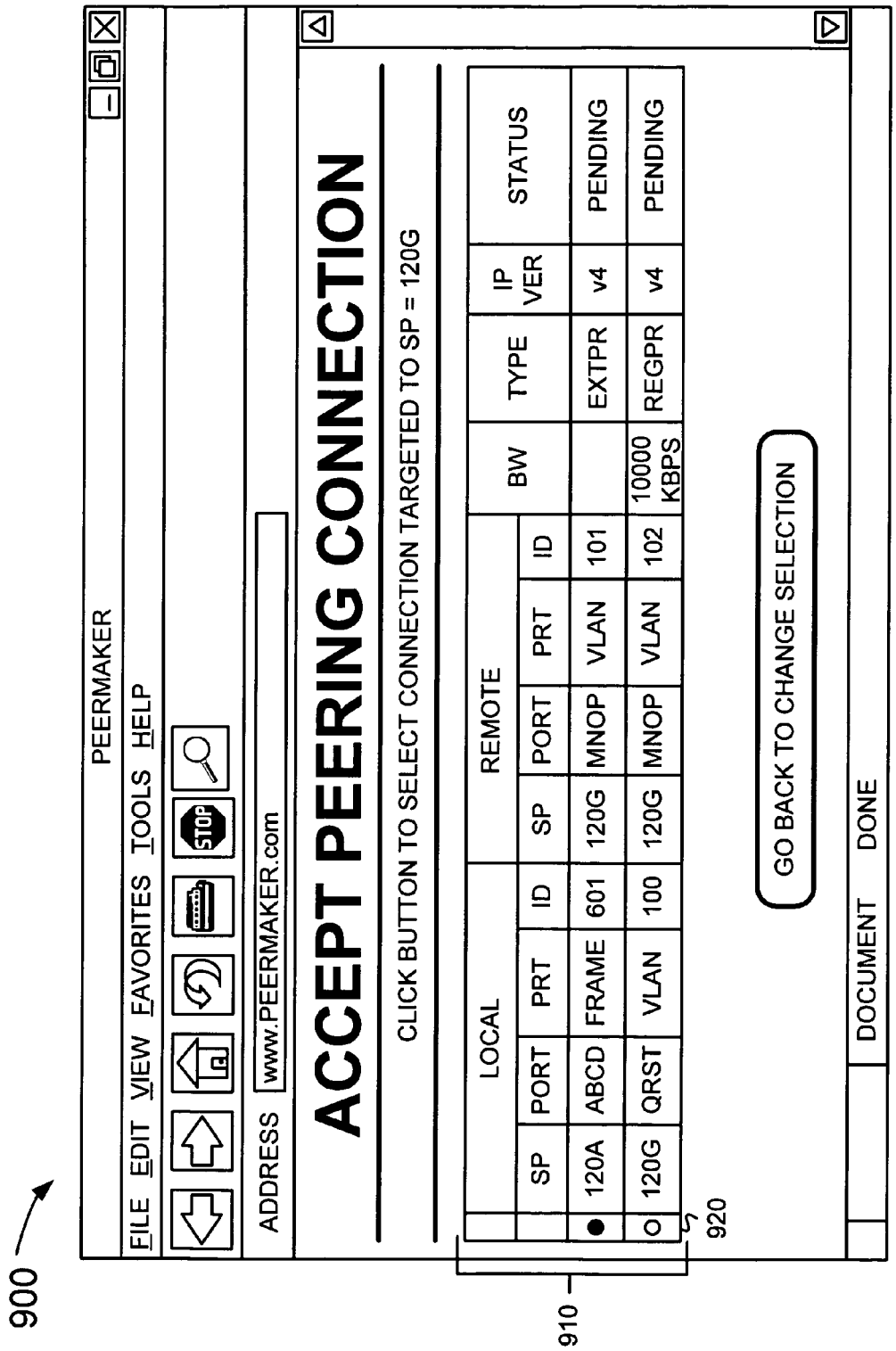
FIG. 9 illustrates an exemplary peering connection acceptance graphical user interface that may be presented to a destination customer in an implementation consistent with the principles of the invention.

Peering device 150 may cause a peering connection acceptance graphical user interface to be presented to the destination customer at user device 130D (act 535). FIG. 9 illustrates an exemplary peering connection acceptance graphical user interface 900 that may be presented to the destination customer in an implementation consistent with the principles of the invention. As illustrated, graphical user interface 900 may include a list 910 of pending peering connections to the destination customer. Each entry in the list may identify the origination customer's connection information (e.g., the origination customer's SP, port identifier, the type of communication service employed by the origination customer, and the origination customer's connection identifier), the destination customer's connection information (e.g., the destination customer's SP, port identifier, the type of communication service employed by the destination customer, and the destination customer's connection identifier), the bandwidth requested (if any), the type of peering connection requested (e.g., extended peering (EXTPR) or regional peering (REGPR)), the communication protocol, and the status of the connection request. Each entry in list 910 may be associated with a radio button 920 that allows the destination customer to select the peering connection request that he/she wants to accept. Each entry in list 910 may be associated with additional or other fields, such as information identifying the origination customer who has requested the new peering connection.

Returning to the processing described in FIGS. 5A and 5B, if the destination customer accepts the origination customer's new peering connection request by, for example, selecting the appropriate radio 920 in graphical user interface 900 (act 540, FIG. 5B), peering device 150 may optionally notify the origination and destination customers that the new peering request has been accepted (act 545). Peering device 150 may notify the origination and destination customers via any well-known technique (e.g., e-mail, facsimile, instant message, telephone, etc.).

FIG. 10 illustrates an exemplary e-mail notification 1000 that may be sent to the origination and destination customers in an implementation consistent with the principles of the invention. As illustrated, e-mail notification 1000 may specify the serial number that has been assigned to this new peering connection transaction and provide details regarding the new peering connection.

Similar to e-mail notification 800, e-mail notification 1000 may specify the origination customer's connection information (e.g., from SP 120A, port ID ABCD, and the origination customer's connection identifier DLCI 601). E-mail notification 1000 may also specify the destination customer's connection information (e.g., to SP 120G, port ID MNOP, and the destination customer's connection identifier VLAN ID 101). E-mail notification 1000 may specify the type of connection to be established. In this example, an extended peering connection is to be established between regional peering facility 110A located in DC and regional peering facility 110C located in SJ. E-mail notification 1000 may further specify the service class and protocol to be used for the new peering connection. Although not shown, e-mail notification 1000 may include the bandwidth allotted to the new peering connection when, for example, priority service is to be used.

Returning to the processing described in FIGS. 5A and 5B, peering device 150 may cause the peering connection to be established between port ABCD (in the example above) associated with regional peering facility 110A and port MNOP associated with regional peering facility 110C (act 550, FIG. 5B). In essence, peering device 150 may forward the peering connection information to a regional peering facility, such as regional peering facility 110A (the regional peering facility associated with the origination customer), which may establish a logical data path between port ABCD and port MNOP. Establishing a logical data path between two ports is well-known in the art and, thus, will not be described in detail herein. For example, the establishment of the logical data path may involve the transmission of a setup message from regional peering facility 110A to regional peering facility 110C and the transmission of a setup acknowledgement message from regional peering facility 110C to regional peering facility 110A. The setup message and setup acknowledgement message may be transmitted through a group of network devices (e.g., switches and/or routers) located between regional peering facilities 110A and 110C. The group of network devices may store an entry in a lookup table for the logical data path so that each network device is aware that traffic from the origination customer is to be forwarded to regional peering facility 110C and traffic from the destination customer is to be forwarded to regional peering facility 110A. Other techniques for establishing a logical path between ports ABCD and MNOP may alternatively be used.

Regional peering facility 110A may notify peering device 150 when the peering connection has been established. Peering device 150 may then notify the origination customer and destination customer that the new peering connection has been established (act 555). Peering device 150 may notify the origination and destination customers via any well-known technique (e.g., e-mail, facsimile, instant message, telephone, etc.).

FIG. 11 illustrates an exemplary e-mail notification 1100 that may be sent to the origination and destination customers in an implementation consistent with the principles of the invention. As illustrated, e-mail notification 1100 may specify the serial number that has been assigned to the new peering connection transaction and provide details regarding the newly established peering connection.

Similar to e-mail notification 800, e-mail notification 1100 may specify the origination customer's connection information (e.g., from SP 120A, port ID ABCD, and the origination customer's connection identifier DLCI 601). E-mail notification 1100 may also specify the destination customer's connection information (e.g., to SP 120G, port ID MNOP, and the destination customer's connection identifier VLAN ID 101). E-mail notification 1100 may specify the type of connection that has been established. In this example, an extended peering connection has been established between regional peering facility 110A located in DC and regional peering facility 110C located in SJ. E-mail notification 1100 may further specify the service class and protocol to be used for the newly established peering connection. Although not shown, e-mail notification 1100 may include the bandwidth allotted to the newly established peering connection when, for example, priority service is to be used.

Returning to the process described in FIGS. 5A and 5B, if the destination customer does not accept the origination customer's peering connection request (act 540, FIG. 5B), peering device 150 may notify the origination customer of such via an well-known technique (act 560).

In addition to establishing new peering connections, peering device 150 may allow customers to perform a number of other functions. For example, customers may modify and delete existing peering connections (e.g., move peering connections from one port to another; list, assign, modify, rename, and unassign ports; etc.); report on connections, ports, and failed login attempts; and manage user accounts. Peering device 150 may provide graphical user interfaces to customers for performing these functions, thereby allowing customers to perform these functions via a network connection.

CONCLUSION

Implementations consistent with the principles of the invention provide extended peering capabilities in a communications network. Extended peering allows a customer to peer with other customers regardless of where the other customers are located. In one implementation, the customer may build and maintain peering connections with other customers using, for example, web-based graphical user interfaces.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on certain devices performing certain functions, it will be appreciated that, in other implementations consistent with the principles of the invention, other devices in system 100 may perform some or all of the functions described above.

While a series of acts has been described with respect to FIGS. 5A and 5B, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, using one or more processors and from a first customer via a web-based interface, selection of a first port, from a first plurality of ports, the first port being associated with the first customer and located in a first geographical region;
receiving, using one or more processors and from the first customer via the web-based interface, selection of a second port, from a second plurality of ports, the second port being associated with a second customer and located in a second geographical region different than the first geographical region;
receiving, using one or more processors and from the first customer via the web-based interface, selection of a communication protocol;
receiving, using one or more processors, a request, from the first customer via the web-based interface, to establish a peering connection, based on the selected communication protocol, between the selected first port and the selected second port;
sending, using one or more processors, a notification to the second customer, in response to receiving the request from the first customer, the notification including information identifying a first service provider associated with the first customer, information identifying a second service provider associated with the second customer, and information identifying the selected communication protocol;
detecting, using one or more processors, that the second customer has accepted the request to establish the peering connection after sending the notification; and
establishing, using one or more processors, in response to detecting that the second customer has accepted the request, the peering connection based on the received request.

2. The method of claim 1 where the request includes:
the information identifying the first service provider associated with the first customer, information identifying the first port, the information identifying the second service provider associated with the second customer, and information identifying the second port.

3. The method of claim 2 where the request further includes:
at least one of information identifying a class of service associated with the peering connection or information identifying a bandwidth.

4. The method of claim 1 where sending the notification includes:
sending the notification, to the second customer, via e-mail.

5. The method of claim 1 where sending the notification includes:
providing information relating to the request.

6. The method of claim 5 where the information, relating to the request, includes:
a connection identifier associated with the first customer,
information identifying the second port, and
a connection identifier associated with the second customer.

7. The method of claim 6 where the information relating to the request further includes at least one of:
information identifying a type of peering connection to be established,
information identifying a service class associated with the peering connection, or
information identifying the selected communication protocol.

8. The method of claim 1 further comprising:
providing a second web-based interface to the second customer, the second web-based interface allowing the second customer to accept the request from the first customer.

9. The method of claim 8 where the second web-based interface provides the information identifying the first service provider associated with the first customer, information identifying the first port, a connection identifier associated with the first customer, the information identifying the second service provider associated with the second customer, information identifying the second port, and a connection identifier associated with the second customer.

10. The method of claim 9 where the second web-based interface further provides at least one of information identifying a type of peering connection to be established, information identifying a service class associated with the peering connection, or information identifying the selected communication protocol.

11. The method of claim 1 further comprising:
notifying, based on detecting that the second customer has accepted the request to establish the peering connection, the first customer and the second customer that the request has been accepted.

12. The method of claim 11 where notifying the first customer and the second customer includes:
sending a notification, to the first customer and the second customer, via e-mail.

13. The method of claim 12 where the e-mail includes:
the information identifying the first service provider associated with the first customer,
information identifying the first port,
a connection identifier associated with the first customer,
the information identifying the second service provider associated with the second customer,
information identifying the second port, and
a connection identifier associated with the second customer.

14. The method of claim 1 further comprising:
notifying, after establishing the peering connection, the first customer and the second customer that the peering connection has been established.

15. A system comprising:
a network device comprising:
a memory to store instructions; and
a processor to execute the instructions in the memory to:
cause a web-based interface to be provided to a user device, the web-based interface allowing a first user to request that an extended peering connection be established between the first user and a second user,
receive selection of information from the first user, via the web-based interface, the selected information relating to the extended peering connection, and the selected information including information identifying a first port located in a first geographical region, information identifying a first service provider associated with the first port, information identifying a second port located in a second geographical region different than the first geographical region, and information identifying a second service provider associated with the second port,
send a notification, to the second user, that the extended peering connection has been requested, in response to receiving the information from the first user,
where the notification includes the information identifying the first service provider, the information identifying the second service provider, and information identifying a communication protocol associated with the extended peering connection,
detect that the second user has accepted the extended peering connection after sending the notification, and
cause the extended peering connection to be established between the first user and the second user, based on the received information selected by the first user via the web-based interface.

16. The system of claim 15 where the received information further includes the information identifying the communication protocol, and
where the first port, from which the extended peering connection is to be established, is associated with the first user, and the second port, to which the extended peering connection is to be established, is associated with the second user.

17. The system of claim 15 where the processor is further to:
notify the second user, in response to receiving the information from the first user, that the extended peering connection has been requested.

18. The system of claim 17 where the processor is further to:
assign information uniquely identifying the extended peering information prior to notifying the second user,
where the processor is to send the notification, to the second user, via at least one of e-mail, facsimile, or instant message, and
where the at least one of the e-mail, the facsimile, or the instant message includes the information uniquely identifying the extended peering information and the selected information.

19. The system of claim 15 where the processor is further to:
cause a second web-based interface to be provided to the second user, the second web-based interface allowing the second user to accept the extended peering connection.

20. The system of claim 19 where the processor is further to:
cause the second web-based interface to provide, to the second user, a list of pending requested peering connections, the list including the requested extended peering connection and at least one other requested peering connection to be established between the second user and a third user,
where the second web-based interface allows the second user to select the requested extended peering connection from the list of pending requested peering connections.

21. The system of claim 19 where the processor is further to:
notify the first user when the second user accepts the request, and
notify the first user when the second user does not accept the request.

22. The system of claim 21 where the processor is further to notify the first user via at least one of e-mail, facsimile, or instant message.

23. The system of claim 15 where the processor is further to:
notify the first user and the second user when the extended peering connection has been established.

24. The system of claim 23 where the processor is to notify the first user and the second user via at least one of e-mail, facsimile, or instant message.

25. A method comprising:
causing, using one or more processors, a graphical user interface to be provided to a user device, the graphical user interface allowing a first user to request that a peering connection be established between two ports, the two ports being selected by the user via the graphical user interface;
receiving, using one or more processors, information selected by the first user, via the graphical user interface, the information, selected by the first user, relating to the peering connection requested from the user device, and the information, selected by the first user, including information identifying a first service provider associated with a first port, of the two ports, and information identifying a second service provider associated with a second port, of the two ports;
sending, using one or more processors, to a second user associated with the second port, a notification of the peering connection in response to receiving the information selected by the first user,
where the notification includes the information identifying the first service provider, the information identifying the second service provider, and information identifying a communication protocol associated with the peering connection;
receiving, using one or more processors, a notification, from the second user, that the peering connection has been accepted after sending the notification; and
establishing, using one or more processors and in response to receiving the notification that the peering connection has been accepted, the peering connection between the two ports based on the received information selected by the first user via the graphical user interface.

26. The method of claim 25 where the communication protocol includes Internet Protocol,
where sending the notification includes:
sending the notification to the second user via at least one of e-mail, facsimile, or instant message,
where the at least one of the e-mail, the facsimile, or the instant message includes the received information.

27. The method of claim 25 further comprising:
causing a second graphical user interface to be provided to the second user, where the second user is notified via the second graphical user interface.

28. A system comprising:
at least one network device comprising:
a memory to store instructions; and
a processor to execute the instructions in the memory to:
receive, via a graphical user interface, selection of information identifying a first port associated with a first user,
receive, via the graphical user interface, selection of information identifying a first service provider associated with the first port,
receive, via the graphical user interface, selection of information identifying a second port associated with a second user,
receive, via the graphical user interface, selection of information identifying a second service provider associated with the second port,
receive, via the graphical user interface, selection of information identifying a communication protocol,
receive, from the first user, a request to establish a peering connection, between the first port and the second port selected via the graphical user interface, based on the information identifying communication protocol, the request comprising the information identifying the first port, the information identifying the second port, the information identifying the first service provider, the information identifying the second service provider, and the information identifying the communication protocol,
send a notification to the second user, in response to receiving the request to establish the peering connection,
where the notification includes the information identifying the first service provider, the information identifying the second service provider, and the information identifying the communication protocol,
detect that the second user has accepted the request to establish the peering connection, after sending the notification, and
establish the peering connection, between the first port and the second port, based on the received request and the communication protocol, when the second user has accepted the request to establish the peering connection.

29. The system of claim 28, where the processor is further to cancel the request when the peering connection is not established within a predetermined period of time.

* * * * *